(12) United States Patent
Kuwabara et al.

(10) Patent No.: US 8,311,529 B2
(45) Date of Patent: Nov. 13, 2012

(54) COORDINATION OPERATION METHOD AND MOBILE COMMUNICATION TERMINAL

(75) Inventors: Masahiko Kuwabara, Tokyo (JP); Kazuo Aoki, Tokyo (JP); Toshiro Matsumura, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 989 days.

(21) Appl. No.: 11/590,816

(22) Filed: Nov. 1, 2006

(65) Prior Publication Data

US 2007/0129047 A1    Jun. 7, 2007

Related U.S. Application Data

(63) Continuation of application No. PCT/JP2005/011546, filed on Jun. 23, 2005.

(30) Foreign Application Priority Data

Jun. 30, 2004  (JP) ................................. 2004-192779

(51) Int. Cl.
*H04M 3/00* (2006.01)
(52) U.S. Cl. .......................................... 455/418; 705/41
(58) Field of Classification Search ........................ None
See application file for complete search history.

(56) References Cited

U.S. PATENT DOCUMENTS

| | | | |
|---|---|---|---|
| 2004/0072589 A1* | 4/2004 | Hamamura et al. | 455/550.1 |
| 2004/0095401 A1* | 5/2004 | Tomimori | 345/864 |
| 2004/0259536 A1* | 12/2004 | Keskar et al. | 455/418 |

FOREIGN PATENT DOCUMENTS

| | | |
|---|---|---|
| JP | 4-199355 | 7/1992 |
| JP | 2001-237923 | 8/2001 |
| JP | 2002-27101 | 1/2002 |
| JP | 2003-46629 | 2/2003 |
| JP | 2003-125076 | 4/2003 |
| JP | 2004-72199 | 3/2004 |
| WO | WO 94/11815 | 5/1994 |

* cited by examiner

*Primary Examiner* — Marcos Batista
(74) *Attorney, Agent, or Firm* — Kratz, Quintos & Hanson, LLP

(57) ABSTRACT

A mobile communication terminal having a structure including a host section and an engine section is built compactly. —As a request for using a host-connecting device is received from an engine section 40, a host section 30 makes a judgment of whether or not a current state of an engine processor of the engine section 40 is an engine-mode state of controlling actively an operation of an engine-connecting device connected to the engine processor of the engine section 40, and the engine-mode state is estimated to be continued. Further, when a result of the judgment is affirmative, the host section 30 operates a host-connecting section, according to an operation mode specified by operation mode parameters. As a result, in a mode in which a request is made by an application executed by the engine processor, a specific host-connecting device which the application has desired to use is operated.

7 Claims, 10 Drawing Sheets

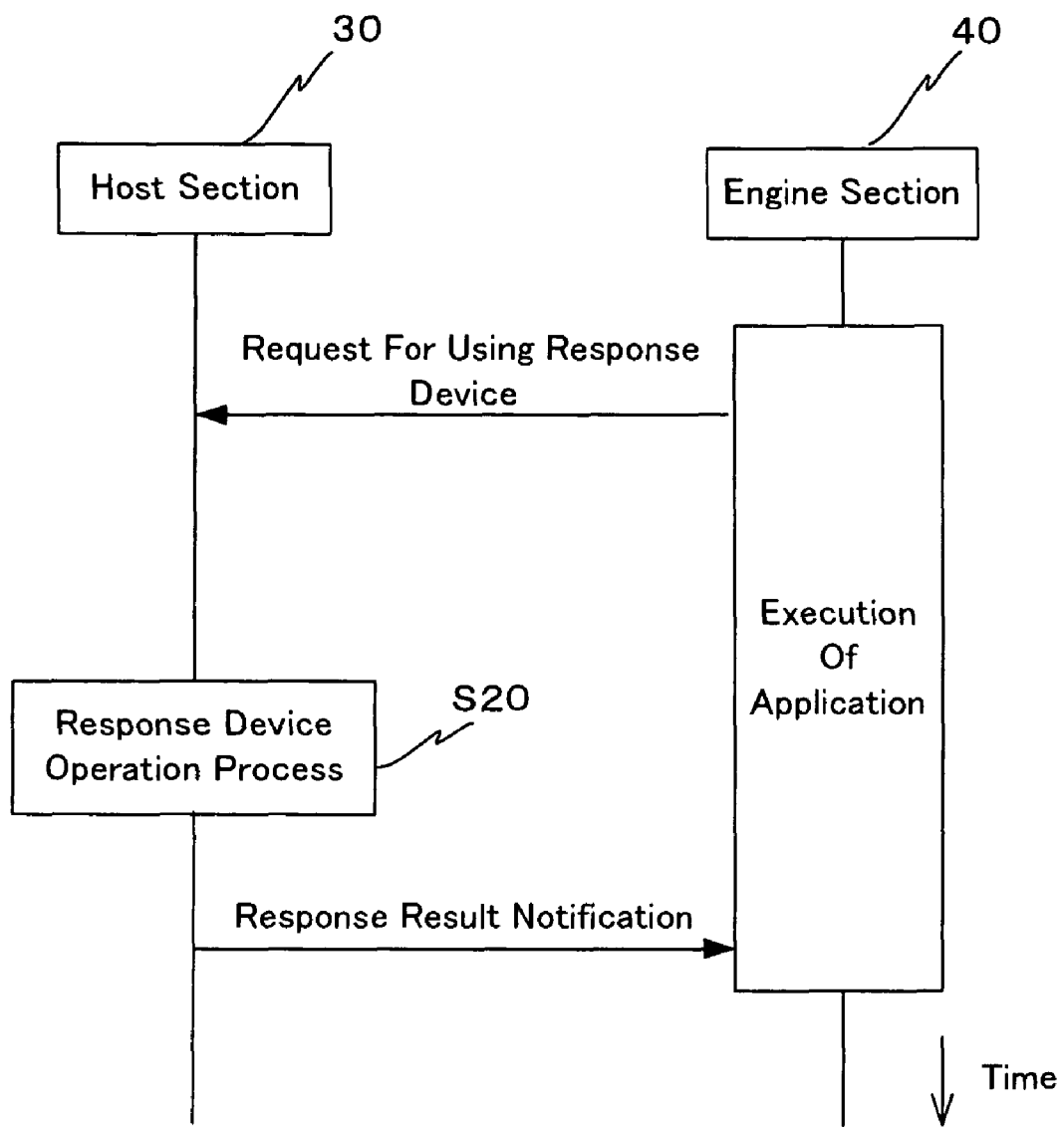

COORDINATION OPERATION METHOD AND MOBILE COMMUNICATION TERMINAL

RELATED APPLICATION

This a continuation application of the international patent application No. PCT/JP2005/011546 filed with Application date: Jun. 23, 2005. The present application is based on, and claims priority from, J.P. Application 2004-192779, filed on Jun. 30, 2004, the disclosure of which is hereby incorporated by reference herein its entirety.

BACKGROUND OF THE INVENTION

The present invention relates to a coordination method and a mobile communication terminal, and more particularly to a coordination method which is a method of operating by coordination between a host section which performs a processing associated with a communication with an outside, and an engine section which executes a predetermined function under a management of the host section, in a mobile terminal apparatus, and a mobile communication terminal which uses the coordination method.

BACKGROUND ART

Mobile communication terminals such as a cellular phone have been hitherto used widely. There has been a remarkable development in the mobile communication terminals, particularly in a technology related to the cellular phone. Optional functions for enjoying games and listening to music, in addition to a communication function via a mobile communication network which is an essential function as the mobile communication terminal, have also been installed.

In such mobile communication terminal, a processor which performs various data processing for carrying out the essential functions and the optional functions is built-in. Resources such as a storage section which includes a storage element for storing various computer programs and data, a wireless communication section for performing a wireless communication, an operating section for making operation commands by a user, and a notifying section (a display section and an audio output section) for notifying various information to the user are connected to this process. Moreover, the processor executes a computer program stored in the storage section, and by controlling appropriately the resources connected according to the requirement, the essential functions and the optional functions are carried out.

SUMMARY OF THE INVENTION

As it has been mentioned above, in a conventional mobile communication terminal, since it is necessary to carry out various functions, an ordinary built-in processor is adopted. This is an excellent method from a point of view of letting the mobile communication terminal to have a simple structure, and to reduce a size and an electric power consumption of the mobile communication terminal. However, when a general processor is used, even if an attempt is made to improve a performance of an operation of an optional function for enjoying the games and listening to music for example, it is difficult to have a significant improvement in the performance.

Incidentally, when a comparison is made with other information processing apparatuses, it can be said that the improvement in performance of the mobile communication terminal is sought for the operation of optional functions. The concrete examples of the operation of the optional function which is sought to be improved are execution of games and reproducing music and so forth. However, in a case of operation of the optional function, particularly a screen display process and an audio data output process exert substantial load on the processor.

Moreover, although the essential functions and the optional functions mentioned above are sought to be carried out in the mobile communication terminal, the user being a single person as a general rule, the essential functions and the optional functions are not sought to be operated independently at the same time, whatever may be the case. For example, when the operation of conversation which is an operation of the essential function is being carried out, an operation of a game which is an operation of the optional function is not sought to be carried out.

Due to the abovementioned reasons, causing an engine section which includes an engine processor to execute an application dealing with the operation of the optional functions, under a management of a host section which includes a host processor which performs a communication operation, upon introducing an engine processor specifically for the optional functions which is able to perform the image display processing and the audio-data output processing in excellent manner, can be taken into consideration. When such structure including the host section and the engine section is adapted, a device is connected to the host processor of the host section, and also a device is connected to the engine processor of the engine section.

At this time, a structure in which all devices used in association with the operation of the essential function such as the communication operation are connected to the host processor, and all devices used in association with the operation of the optional function such as the application operation are connected to the engine processor can be considered. However, when the device used in association with the operation of the essential function and the device used in association with the operation of the optional function are compared, it can be noticed that many of such devices have common functions, and in view of a fact that the essential function and the optional function are not sought to be operated independently at the same time in any case, as it has been mentioned above, a structure in which a device for the essential functions and a device for the optional functions are installed independently is highly redundant, and it is not possible to structure the mobile communication terminal compactly.

Therefore, a device connected to the host processor and a device connected to the engine processor, have to be segregated. When such a structure is adopted, since there is a wide variety of applications which are executed by the engine section, at the time of the execution of the application by the engine processor, it becomes necessary to deal with a situation in which the device connected to the host processor is desired to be used.

In order to deal with such situation, the host section and the engine section are required to be operated in coordination for realizing the use of the device by the engine processor. However, no concrete technology has been proposed so far regarding as to what sort of coordination of operation between the host section and the engine section would realize the use of the device by the engine processor.

The present invention is made in view of the above-mentioned circumstances, and it is an object of the present invention to provide a coordination method which enables to build compactly an entire mobile communication terminal having a structure which includes a host section which has a host processor, and performs a processing associated with a communication with an outside, and an engine section which has an engine processor, and executes a predetermined function under a management of the host section.

Moreover, it is an object of the present invention to provide a mobile communication terminal which can be built compactly, comprising a host section which performs a processing associated with the communication with the outside, and an engine section which executes the predetermined function under the management of the host section.

According to a first view point of the present invention, a coordination method of the present invention is a method of operating by coordination between a host section which performs a processing associated with a communication with an outside, and an engine section which executes a predetermined function under a management of the host section, in a mobile communication terminal, comprising steps of: making request for using specific host connecting device, at which a request for using a specific host connecting device from among host connecting devices which are connected to a host processor of the host section is sent from the engine section to the host section; judging operation mode at which the host section which has received the request for using the specific host connecting device makes a judgment of whether or not an engine processor of the engine section is in an engine-mode state of controlling actively an operation of at least one engine connecting device which is connected to the engine processor of the engine section, and the engine-mode state is estimated to be continued; and performing specified operation of engine at which, when a judgment result at the step of judging operation mode is affirmative, the host processor operates the specific host connecting device.

In this coordination method, when the engine section desires to use the specific host connecting device from among the host connecting devices which are connected to the host processor of the host section, at the step of making request for using specific host connecting device, the engine section sends the request for using the specific host connecting device. Note that the request for using the specific host connecting device can be let to be accompanied by an operation mode parameter of the specific host connecting device according to the requirement. For example, when the specific host connecting device is a light emitting diode (LED), it is possible to let to specify light-emission intensity in the operation mode parameter. Moreover, it is possible to specify a light-emission cycle, a light-emission time in one cycle of light emission, and a frequency of repetition of the light-emission cycle.

The host section which has received the request for using the specific host connecting device, at the step of judging operation mode, makes the judgment of whether or not the engine processor of the engine section is in an engine-mode state of controlling actively the operation of at least one engine connecting device which is connected to the engine processor of the engine section, and the engine-mode state is estimated to be continued. In this case, the judgment of whether or not the engine-mode state is estimated to be continued is made by judging whether or not there has arisen a need for performing a processing associated with an occurrence of an event having a priority higher than an execution process of the application such as receiving a call, and the host section is not making an attempt to stop or stop temporarily the execution of the application in the engine section. In other words, at the step of judging operation mode, a judgment of whether or not it is estimated that the engine section has issued correctly the request for using the specific host connecting device, and the host section is in a state of being capable of receiving the request for using the specific host connecting device is made.

When the judgment result at the step of judging operation mode is affirmative, at the step of performing specified operation of engine, the host processor operates the specific host connecting device. Note that when the request for using the specific host connecting device accompanies the operation mode parameter, the host processor operates the specific host connecting device according to an operation mode which is specified by the operation mode parameter. As a result of this, in a mode in which a request is made by an application which is executed by the engine processor, a specific host connecting device which the application has desired to use is operated.

Therefore, by using the coordination method of the present invention, when a processor is to be installed in addition to the host processor, the application being executed in the engine processor can be let to use the desired host connecting device in a rationalistic range, without installing a redundant device in a structure of a device connected to each of the processors. In the coordination method of the present invention, it is possible to contribute to building compactly the entire mobile communication terminal having a structure comprising the host section which includes the host processor, and performs the processing associated with the communication with the outside, and the engine section which includes the engine processor, and executes the predetermined function under the management of the host section.

In the coordination method of the present invention, when the judgment result at the step of judging operation mode is negative, the host section can be let to ignore the request for using the specific host connecting device. In this case, when the engine section has issued wrongly the request for using the specific host connecting device, or the engine section has issued rightly the request for using the specific host connecting device, when the host section is judged not to be in a state capable of receiving the request for using the specific host connecting device, the specific host connecting device does not perform an operation according to the request from the engine section, but performs an operation as specified by the host processor. As a result of this, it is possible to operate the host connecting device rationalistically.

In the coordination method of the present invention, the specific host connecting device can be let to be a no-response device of a type in which, after an operation command is received from the host processor, a response is not sent back to the host processor. In this case, since the specific host connecting device does not report a result of operation such as a success or a failure of the operation, and data acquired by the operation to the host processor, the host section does not send back the result of the operation required to the engine section. Therefore, the application which is being executed in the engine section can be created so as to continue the operation without having to wait for a report of whether or not the operation of the specific host connecting device for which the request is made has been performed, after issuing the request for the specific host connecting device. Consequently, although a function and a performance of the application are constrained to some extent, the creating of the application becomes easier.

Note that in many cases, a device which is used for exerting secondarily a tactual effect and a visual effect for increasing a presence at the time of executing the application is a no-response device such as the vibrator, the LED, and the back light of the liquid crystal display apparatus. Consequently, even in a case in which the specific host connecting device is restricted to the no-response device, in many cases it is possible to cause to exert secondarily the tactual effect and the visual effect.

According to a second view point of the present invention, a mobile communication terminal of the present invention comprises: a host section which comprises a host processor, and performs a processing associated with a communication with an outside; at least one host connecting device which is connected to the host processor; an engine section which comprises an engine processor and performs a predetermined function operation under a management of the host section. The host section comprises: a host connecting device controlling means which controls an operation of the host connecting device; an operation mode judging means which makes a judgment of whether or nor the engine processor of the engine section is in an engine-mode state of controlling actively an operation of the engine connecting device, and the engine-mode state is estimated to be continued; and a means for giving command for use of specific host device which, when a judgment result by the operation mode judging means is affirmative, when a request for using a specific host connecting device from among the host connecting devices, notified from the engine section is received, gives a command for operating the specific host connecting device, to the host connecting device controlling means. The engine section comprises: a means for making request for using device for specific host which sends the request for using the specific host connecting device to the host section.

In this mobile communication terminal, when the application executed by the engine section desires to use the specific host connecting device from among the host connecting devices which are connected to the host processor of the host section, the means for making request for using device for specific host of the engine section sends the request for using the specific host connecting device to the host section. In the host section which has received the request for using the specific host connecting device, the operation mode judging means makes a judgment of whether or not a current-state of the engine processor of the engine section is an engine-mode state of controlling actively an operation of the engine connecting device which connects to the engine processor, and the engine-mode state is estimated to be continued. When the result of this judgment is affirmative, the means for performing specified operation of engine operates the specific host connecting device. As a result of this, the specific host connecting device which the application, which is executed by the engine processor, has desired to use is operated.

In other words, in the mobile communication terminal of the present invention, by using the coordination method of the present invention mentioned above, the application being executed in the engine processor can be let to use the desired host connecting device in a rationalistic range, by performing the operation by coordination between the host section and the engine section. Consequently, in the mobile communication terminal of the present invention, it is possible to build compactly the entire mobile communication terminal comprising the host section which performs the processing associated with the communication with the outside, and the engine section which executes the predetermined function under the management of the host section.

In the mobile communication terminal of the present invention, the specific host connecting device can be let to be a no-response device of a type in which, after an operation command is received from the host processor, a response is not sent back to the host processor. In this case, the application which is being executed in the engine section can be created so as to continue the operation without having to wait for a report of whether or not the operation of the specific host connecting device for which the request is made has been performed, after issuing the request for the specific host connecting device. Consequently, although a function or a performance of the application is constrained to some extent, the creating of the application becomes easier.

In this case, the specific host connecting device can be let to be one of devices selected from a group including a vibrator, a light emitting diode, and a back light of a liquid crystal display apparatus in a case in which a liquid crystal display device section of the liquid crystal display apparatus is included in at least one engine connecting device. In this case, it is possible to cause to exert secondarily a tactual effect and a visual effect for increasing a presence at the time of executing the application.

In the mobile communication terminal of the present invention, the host section can be structured to further comprise a wireless communication section which is connected to the host processor, and performs a wireless communication with a base station of a mobile communication network.

As it has been described above, by using a coordination method of the present invention, there is shown an effect that it is possible to build compactly an entire mobile communication terminal comprising a host section which performs a processing associated with a communication with an outside, and an engine section which executes a predetermined function under a management of the host section.

Moreover, according to a mobile communication terminal of the present invention, there is shown an effect that it is possible to build compactly the entire mobile communication terminal comprising the host section which performs the processing associated with the communication with the outside, and the engine section which executes the predetermined function under the management of the host section.

BRIEF DESCRIPTION OF THE DRAWINGS

FIG. 10 is a sequence diagram for describing a second modified embodiment of the operation control process of the host connecting device according to the request from the engine application.

DETAILED DESCRIPTION

An embodiment of the present invention will be described below while referring to FIG. 1A to FIG. 8.

Figure 1A:
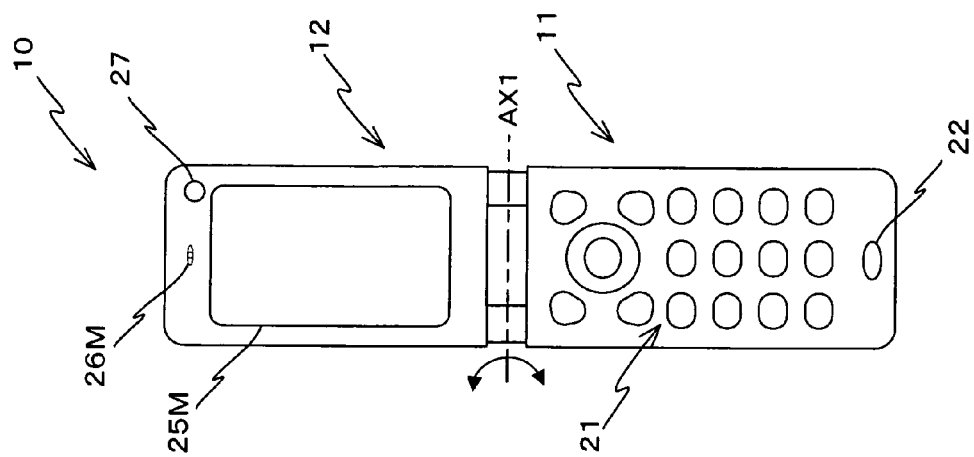
FIG. 1A is a front-side external view of a cellular phone according to an embodiment of the present invention.
Figure 1B:
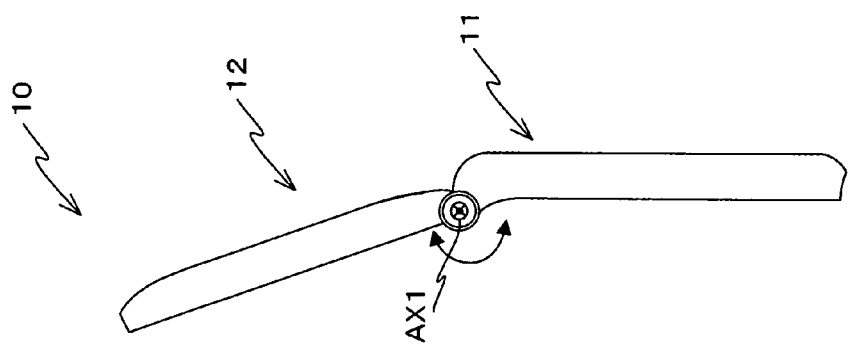
FIG. 1B is a right-side external view of the cellular phone according to the embodiment of the present invention.
Figure 1C:
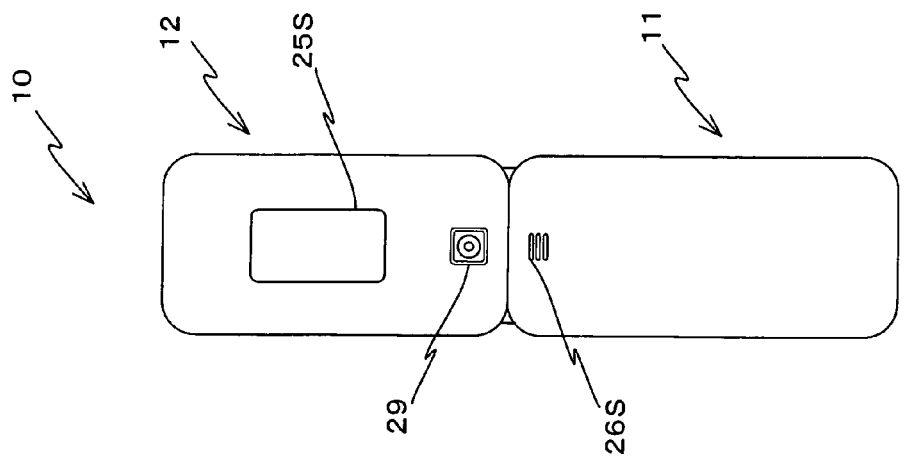
FIG. 1C is a rear-side external view of the cellular phone according to the embodiment of the present invention.

In FIG. 1A to FIG. 1C, and FIG. 2, a structure of a cellular phone 10 which is a mobile communication terminal according to the embodiment is shown schematically. This cellular phone 10 is a so-called clamshell type foldable cellular phone. In this case, a front-side external view of the cellular phone 10 in an unfolded state is shown in FIG. 1A, a right side external view of the cellular phone 10 in the unfolded state is shown in FIG. 1B, and a rear-side external view of the cellular phone 10 in the unfolded state is shown in FIG. 1C. Moreover, in FIG. 2, a functional block structure of the cellular phone 10 is shown.

As shown in FIG. 1A to FIG. 1C, the cellular phone 10 includes a first part 11 and a second part 12 which can be turned with respect to the first part 11, with an axis AX1 as a central axis.

As shown in FIG. 1A, (a) an operating section 21 in which operation keys such as a numerical keypad and function keys are arranged, and (b) a microphone 22 for inputting sound during conversation are disposed in the first part 11. Moreover, as shown in FIG. 1C, (c) a speaker for instructions 26S which generates a sound informing an incoming call and an instruction sound, is disposed on a rear-surface side, when a surface on which the operating section 21 in the first part 11 is disposed is let to be a front face.

As shown in FIG. 1A, (a) a main display section 25M which displays operation instructions, an operation situation, a message received, a result of imaging by an imaging section 29 which will be described later, and an image by an application, (b) a speaker 26M which reproduces an aural signal transmitted from a communication counterpart during conversation, and (c) an LED (Light Emitting Diode) 27 for calling attention of a user, are disposed in the second part 12. Moreover, on a rear-surface side when a display surface of the main display section 25M in the second part 12 is let to be a front surface, (d) a sub-display section 25S which performs an auxiliary display, and (e) the imaging section 29 which takes an image in a field of view of an imaging optical system are disposed as shown in FIG. 1C. In this case, the main display section 25M has a liquid crystal display device section 25ML and a back light 25MB as shown in FIG. 2.

Figure 2:
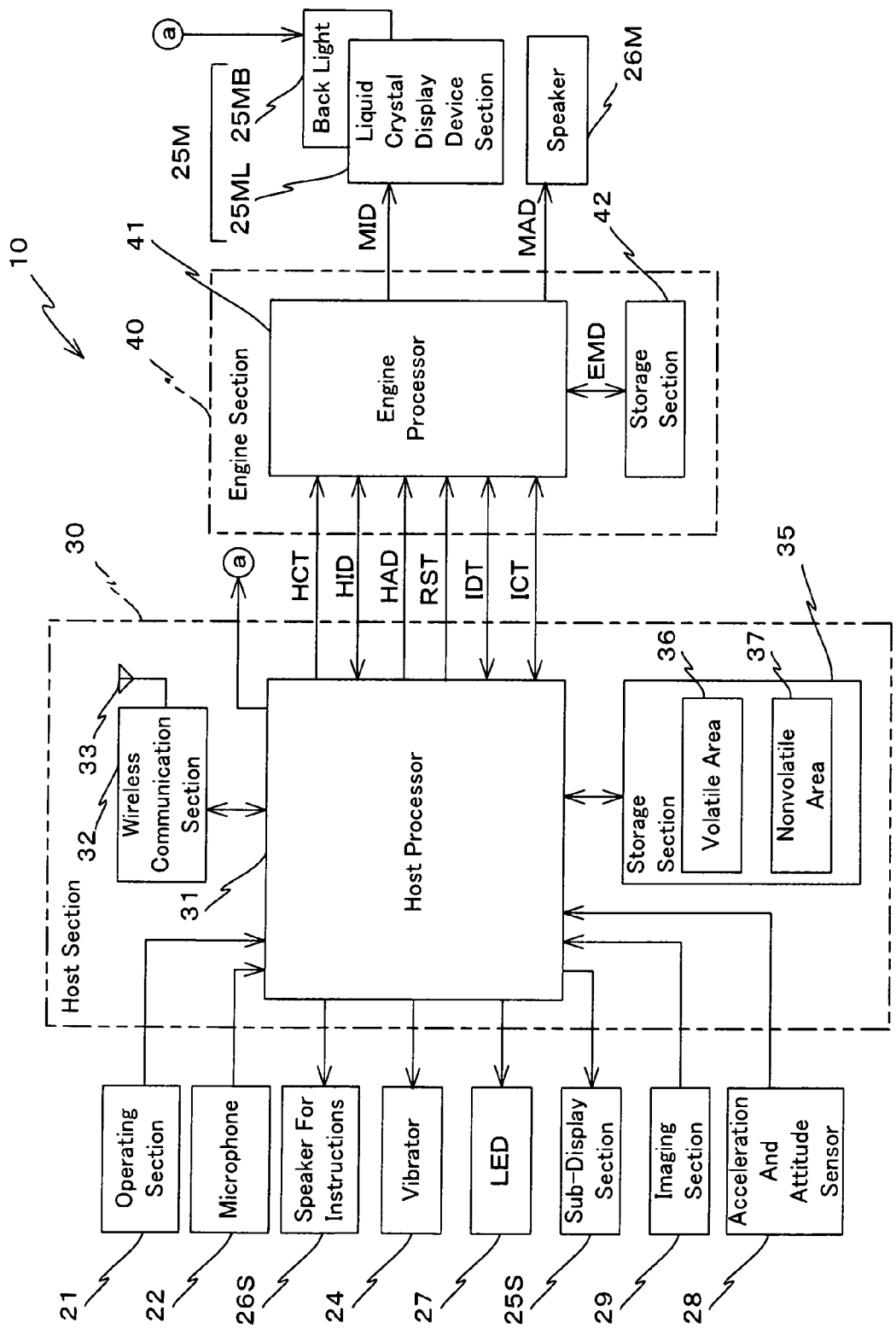
FIG. 2 is a block diagram for describing a functional structure of the cellular phone in FIG. 1A to FIG. 1C.

Moreover, as shown in FIG. 2, the cellular phone 10 further includes (f) a vibrator 24 for notifying an incoming call to the user by causing the cellular phone 10 to vibrate when a call is received, and (g) an acceleration and attitude sensor 28 for detecting an acceleration acting on the cellular phone 10, and an attitude of the cellular phone 10. The vibrator 24 and the acceleration and attitude sensor 28 are disposed inside the cellular phone 10.

Moreover, the cellular phone 10 includes (h) a host section 30 for carrying out basic functions of a cellular phone such as a communication function, and (i) an engine section 40 which executes an application. The host section 30 and the engine section 40 are disposed inside the cellular phone 10.

The host section 30 includes a host processor 31 which performs an integrated control of the entire cellular phone 10, a wireless communication section 32 for transceiving a communication signal via an antenna 31, and a storage section 35 for storing computer programs and data. In this case, the wireless communication section 32 and the storage section 35 are connected to the host processor 31. Moreover, the operating section 21, the microphone 22, the speaker for instructions 26S, the LED 27, the sub-display section 25S, the vibrator 24, the acceleration and attitude sensor 28, the imaging section 29, and the back light 25MB of the main display section 25M which are mentioned above, are connected to the host processor 31.

A central processing unit (CPU) function and a digital signal processor (DSP) function are installed in the host processor 31. Moreover when the host processor 31 executes upon reading out a computer program for host 38 which is stored in the storage section 35 (refer to FIG. 3), an operation of a basic function such as an operation of a communication function, an exchange of various data between the host processor 31 and the engine section 40, and a device operation control process according to a request from the engine section 40 are performed.

Figure 3:
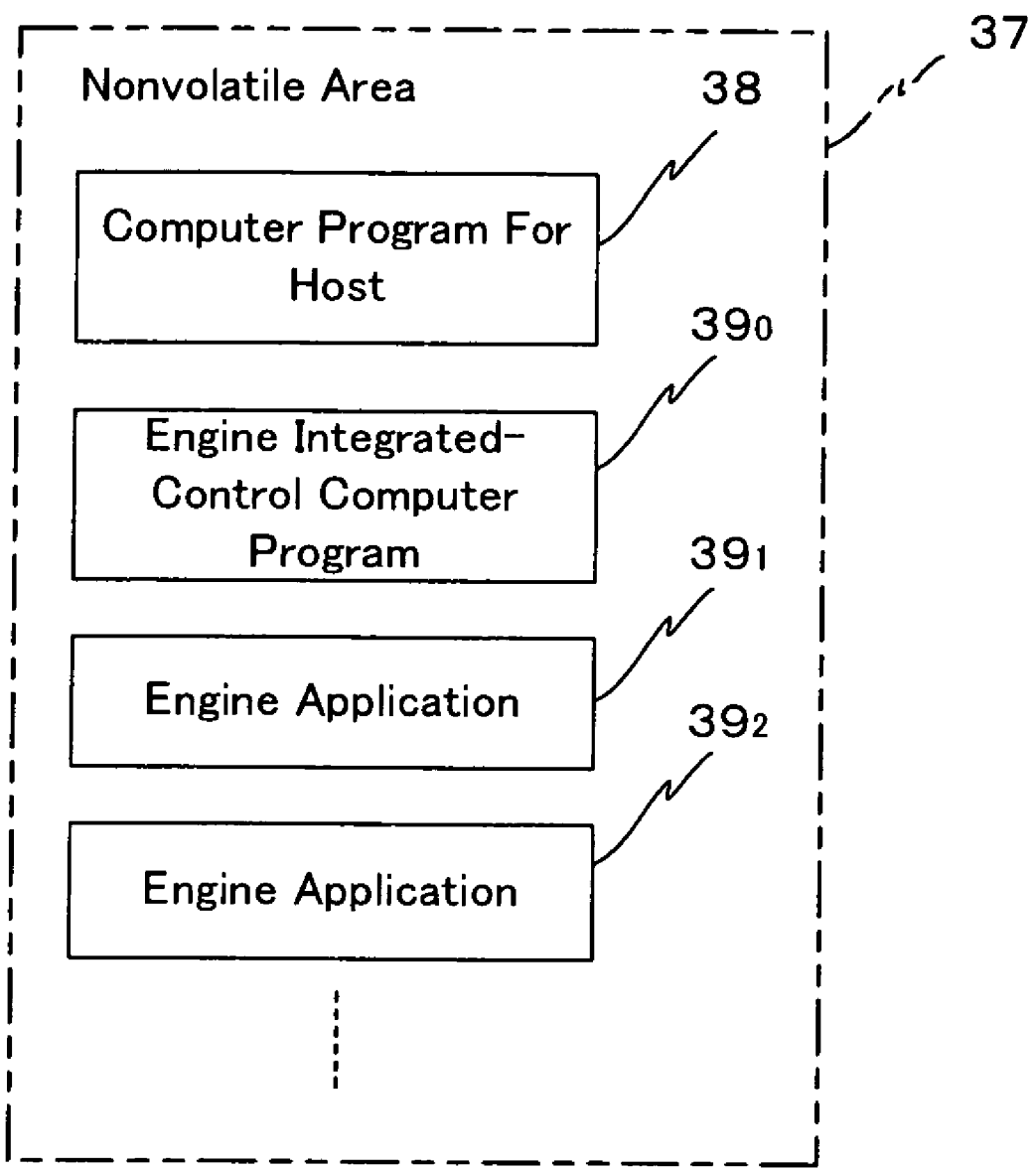
FIG. 3 is a diagram for describing a content of a nonvolatile area in a storage section of a host section in FIG. 2.

The storage section 35 includes a volatile storage area 36 for storing temporarily various data, and a non-volatile area 37 for storing permanently computer programs etc. The volatile area 36 includes a volatile storage element, of which a stored content is not guaranteed when an electric power for operation is not supplied. Moreover, the nonvolatile area 37 includes a nonvolatile storage element, of which a stored content is guaranteed even when an electric power for operation is not supplied. In this case, as shown in FIG. 3, in addition to the computer program for host 38, an engine integrated-control computer program 390, and engine applications $39_1$, $39_2$ ..., which are executed in the engine section, are stored in the nonvolatile area 37.

Coming back to FIG. 2, the engine section 40 includes an engine processor 41 which performs an integrated control of the entire engine section 40, and a storage section 42 which stores computer programs and data executed by the engine processor 41. In this case, the storage section 42 is connected to the engine processor 41. Moreover, the speaker 26M and the liquid crystal display device section 25ML of the main display section 25M are connected to the engine processor 41.

Figure 4:
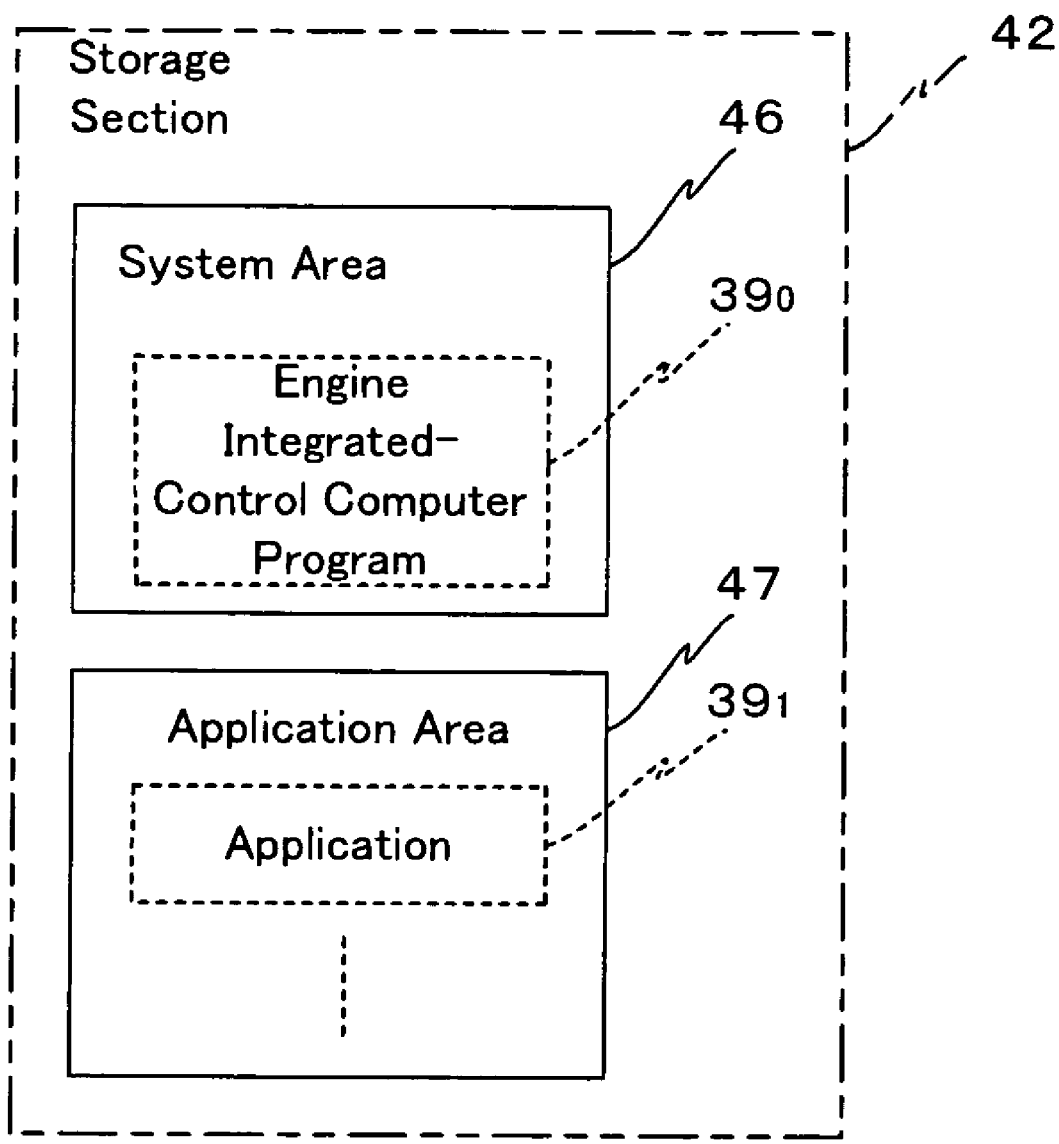
FIG. 4 is a diagram for describing a structure of a storage section in an engine section in FIG. 2.

The storage section 42 includes a volatile storage element, of which a stored content is not guaranteed when the electric power for operation is not supplied. In this case, the storage section 42 includes a system area 46 in which the engine integrated-control computer program $39_0$ is stored, and an application area 47 in which at least any one of the engine applications $39_1$, $39_2$ ..., is stored, as shown in FIG. 4.

Figure 5:
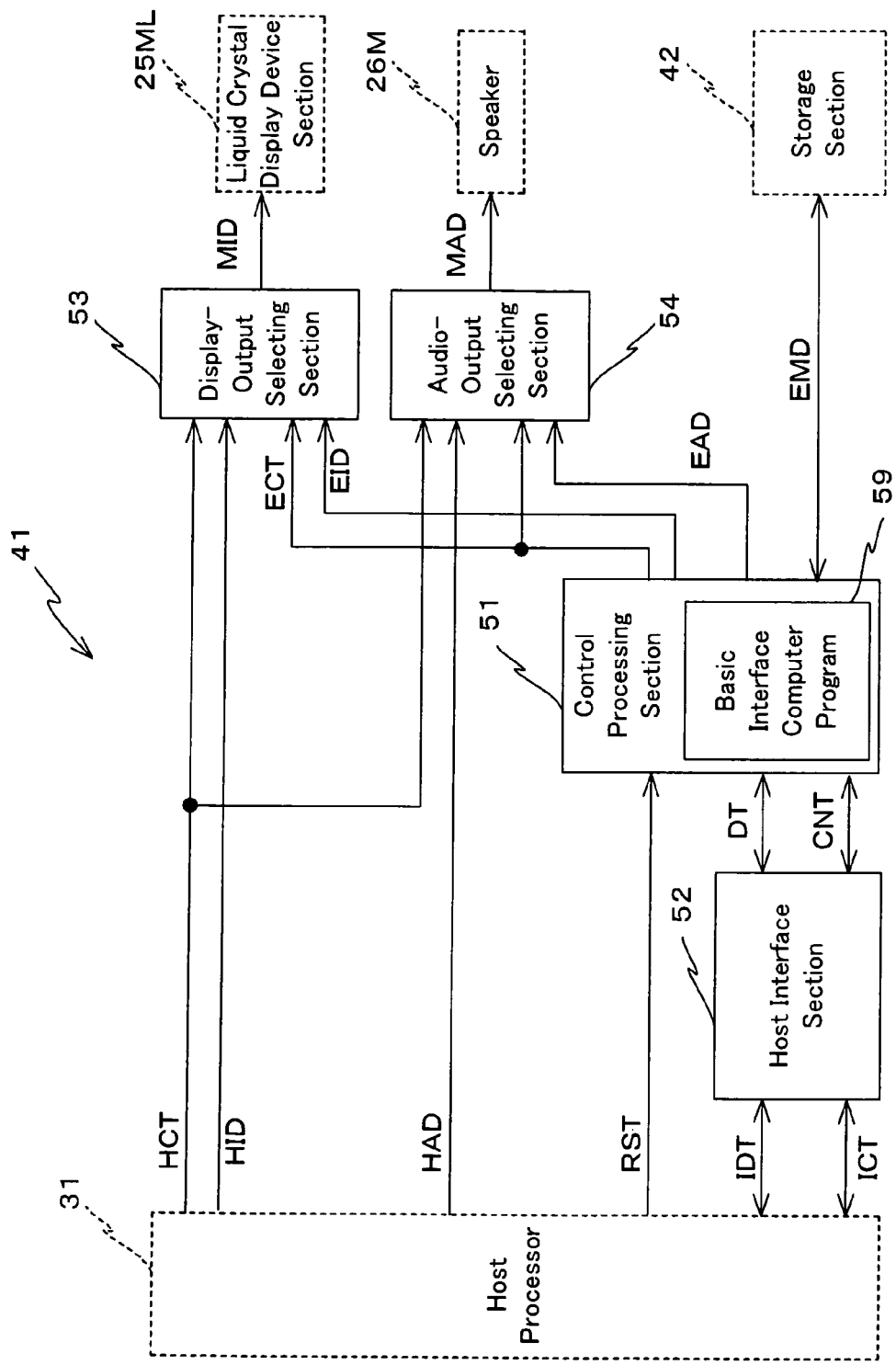
FIG. 5 is a block diagram for describing a structure of an engine processor in FIG. 2.

The engine processor 41, as shown in FIG. 5, includes a control processing section 51 and a host interface section 52. Moreover, the engine processor 41 includes a display-output selecting section 53 for selecting one of a host-display image signal HID from the host section 30 and an engine-display image signal EID from the control processing section 51, as a display-image signal MID which is supplied to the liquid crystal display device section 25ML, and supplying the selected signal to the liquid crystal display device section 25ML. Furthermore, the engine processor 41 includes an audio-output selecting section 54 for selecting one of a host audio signal HAD from the host section 30 and an engine audio signal EAD from the control processing section 51, as an audio signal MAD which is supplied to the speaker 26M.

In the control processing section 51, a basic interface computer program 59 for controlling the operation of the engine section 40 including an interface operation between the engine section 40 and the host section 30, at a previous state of starting execution of the engine integrated-control computer program $39_0$ is built-in. Moreover, the control processing section 51 has a three-dimensional graphic processing function and an audio-generation processing function, and at a time of executing any one of the engine applications $39_1$, $39_2$ ..., exerts the three-dimensional graphic processing function and the audio-generation processing function.

The host interface section 52 is positioned between the host section 30 and the control processing section 51, and acts as an intermediary for various control signals and performing buffering of various commands and various data which are transferred between the host interface section 52 and the host section 30. The host interface section 52 has a two-port RAM (Random Access Memory) element.

In the host interface section 52, one of ports of the two-part RAM element is connected to the control processing section 51 by an internal data signal DT and an internal control signal CNT. In this case, the internal control signal CNT includes signals such as an internal read out command signal from the two-port RAM and an internal write command signal to the two-port RAM, issued by the control processing section 51 toward the host interface section 52. Moreover, the internal control signal CNT includes signals such as an internal interrupt signal indicating that data is sent from the host section 30 toward the engine section 40, issued by the host interface section 52 toward the control processing section 51.

Moreover, in the host interface section 52, in the other port of the two-port RAM element, an 8-bit parallel for example, is also connected to the host section 30 by an interface data signal IDT and an interface control signal ICT. In this case, the interface control signal ICT includes signals such as an interface write command signal to the two-port RAM and an interface read out command signal from the two-port RAM, issued by the host section 30 toward the host interface section 52. Moreover, the interface control signal ICT includes signals such as an interface interrupt signal indicating that data is sent from the engine section 40 toward the host section 30, issued by the host interface section 52 toward the host section 30.

By performing such exchange of signals, transfer of a command and a response associated with adjunct data according to the requirement is performed between the host section 30 and the engine section 40 via the host interface section 52.

In the display-output selecting section 53, in the following manner, selects one of the host-display image signal HID and the engine-display image signal EID as the display image signal MID, according to a signal level of a host-output control signal HCT from the host section 30, and an engine-output control signal ECT from the control processing section 51, and outputs the selected signal. In this case, when the signal level of the host-output control signal HCT is a significant level, and when it is specified that the host-display image signal HID is to be selected by the host-output control signal HCT, irrespective of the signal level of the engine-output control signal ECT, the display-output selecting section 53 selects the host-display image signal HID, and outputs as the display image signal MID. On the other hand, when the signal level of the host-output control signal HCT is an insignificant level, the display-output selecting section 53, according to the signal level of the engine-output control signal ECT, selects one of the host-display image signal HID and the engine-display image signal EID, as the display image signal MID.

In other words, in the display-output selecting section 53, when the signal level of the host-output control signal HCT is the insignificant level and the signal level of the engine-output control signal ECT is the significant level, the display-output selecting section 53 selects the engine-display image signal EID, and outputs as the display image signal MID. Moreover, in the display-output selecting section 53, when the signal level of the host-output control signal HCT is the insignificant level and the signal level of the engine-output control signal ECT is the insignificant level, the display-output selecting section 53 selects the host-display image signal HID, and outputs it as the display image signal MID.

In the audio-output selecting section 54, similarly as in the display-output selecting section 53 as described above, according to the signal level of the host-output control signal HCT and the engine-output control signal ECT, one of the host audio signal HAD and the engine audio signal EAD is selected as the audio signal MAD, and the selected signal is output. In other words, when the signal level of the host-output control signal HCT is the significant level, irrespective of the signal level of the engine-output control signal ECT, the audio-output selecting section 54 selects the host audio signal HAD, and outputs it as the audio signal MAD. Moreover, when the signal level of the host-output control signal HCT is the insignificant level, and the signal level of the engine-output control signal ECT is the significant level, the audio-output selecting section 54 selects the engine audio signal EAD and outputs it as the audio signal MAD. Furthermore, when the signal level of the host-output control signal HCT is the insignificant level, and the signal level of the engine-output control signal ECT is the insignificant level, the audio-output selecting section 54 selects the host audio signal HAD, and outputs it as the audio signal MAD.

Next, a coordination operation between the host section 30 and the engine section 40 in the cellular phone 10 structured as mentioned above will be described while focusing attention on a transition of state of the engine section 40.

Figure 6:
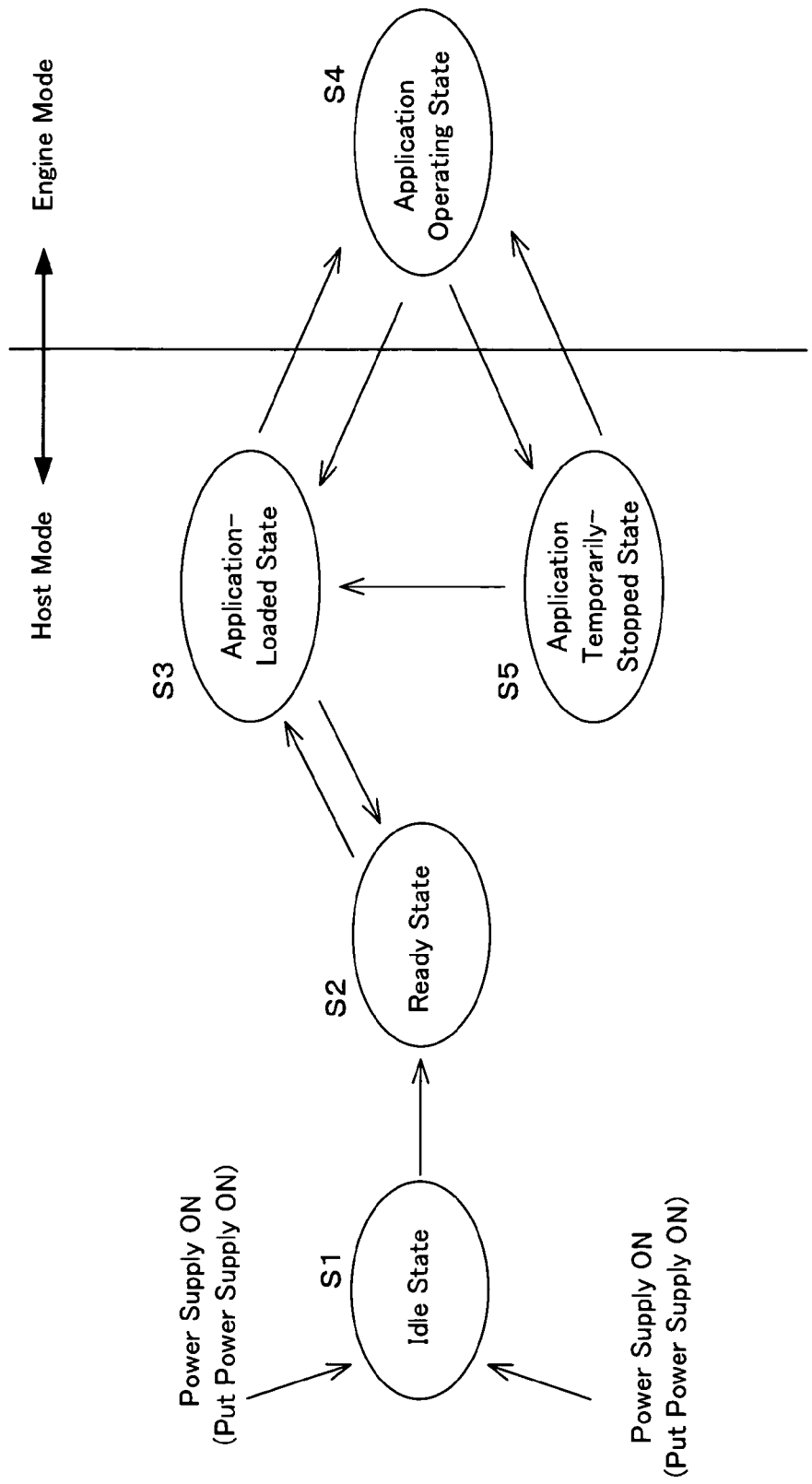
FIG. 6 is a state transition diagram for describing a transition of state of the engine section in FIG. 2.

First of all, the transition of state of the engine section 40 will be described by referring mainly to FIG. 6. An idle state S1 in this FIG. 6 is a state in which the basic interface computer program 59 described above is being executed in the control processing section 51. Moreover, ready state S2 is a state in which the engine integrated-control computer program $39_0$ is being executed in the control processing section 51, and no application whatsoever is stored in the application area 47 of the storage section 42. Furthermore, an application-loaded state S3 is a state in which some application is stored in the application area 47 of the storage section 42, and neither of the application is being executed or stopped temporarily. Moreover, an application operating state S4 is a state in which at least one application stored in the application area 47 of the storage section 42 is being executed in the control processing section 51. Furthermore, an application temporarily-stopped state S5 is a state in which at least one application is stopped temporarily and no application whatsoever is being executed in the control processing section 51.

When the power supply of the cellular phone 10 is put ON, the host section 30 is initialized and a supply of the electric power for operation and a basic clock signal to the engine section 40 is started. When the supply of the electric power for operation and the basic clock signal is started, in the engine section 40, the control processing section 51 performs an initialization operation. As shown in FIG. 6, the engine section 40 assumes the idle state S1, and the basic interface computer program 59 described above is executed in the control processing section 51. Moreover, in the engine section 40, even when a reset command signal RST from the host section 30 is detected to have been issued, the control processing section 51 performs the initialization operation.

As the host section 30 is initialized, the host section 30 lets the signal level of the host-output control signal HCT to be the significant level. Moreover, as the engine section 40 is initialized, in the engine section 40, the signal level of the engine-output control signal ECT is let to be the insignificant level. As a result of this, in the idle state S1, the engine section 40 is a state of a host mode in which the liquid crystal display device section 25ML and the speaker 26M are controlled by the host section 30.

Thus, when an initial loading process from a loading to the engine integrated-control program $39_0$ to the section 40 up to a start of execution of the engine integrated-control computer program $39_0$, which is a process, is performed after the engine section 40 is initialized, the engine section 40 assumes the ready state S2. In this initial loading process, an initial computer program load command with the engine integrated-control computer program $39_0$ as adjunct data, and an execution-start command of an engine integrated-control computer program without the adjunct data are issued from the host section 30 to the engine section 40.

As the initial loading process is completed, the host section 30 lets the signal level of the host-output control signal HCT to be the insignificant level. On the other hand, in the engine section 40, even when the ready state S2 is assumed, the signal level of the engine-output control signal ECT is maintained to be the insignificant level. As a result, the engine section 40 assumes the host-mode state even in the ready state S2, similarly as in the idle state S1.

Note that half way in the initial loading process, when an execution of a process having a priority over the initial loading process, like receiving a call, and a specific command by an operation of the operating section 21 by the user, is sought to be performed by the host section 30, the host section 30 discontinues the initial loading process, and issues the reset command signal RST to the engine section 40. As a result of this, the engine section 40 is initialized.

In the ready state S2, an application loading process which includes a process of issuing an application command by the host section 30 with an engine application $39_j$ as the adjunct data, is performed, and as the engine application $39_j$ is loaded in the application area 47 of the storage section 42, the engine section 40 assumes the application-loaded state S3. Even in the application-loaded state S3, in the engine section 40, the signal level of the engine-output control signal ECT is let to be the insignificant level. As a result, even in the application-loaded state S3, the engine section 40 assumes the host-mode state, similarly as in the idle state S1 and the ready state S2.

Note that when the loading process of the engine application $39_j$ is performed in the application-loaded state S3, the application-loaded state S3 is maintained as the state of the engine section 40. Moreover, when the loading process of the engine application $39_j$ is performed in the application temporarily-stopped state S5, the application temporarily-stopped state S5 is maintained as the state of the engine section 40.

The engine application $39_j$ loaded in the application area 47 of the storage section 42 is unloaded from the application area 47 by an application unloading process which includes a process of issuing an application unload command by the host section 30, having an identifier of the engine application $39_j$ as the adjunct data. The unloading process of the engine application $39_j$ is performed in the application-loaded state S3, and when no application whatsoever is stored in the application area 47 of the storage section 42, the state of the engine section 40 undergoes a transition from the application-loaded state S3 to the ready state S2. Whereas, after the unloading process of the engine application $39_j$ in the application-loaded state S3 is performed, when some application is still stored in the application area 47 of the storage section 42, the application-loaded state S3 is maintained as the state of the engine section 40. Moreover, when the loading process of the engine application $39_j$ is performed in the application temporarily-stopped state S5, the application temporarily-stopped state S5 is maintained as the state of the engine section 40. Note that in the application temporarily-stopped state S5, the application which is temporarily stopped cannot be unloaded.

The engine application $39_j$ loaded in the application area 47 of the storage section 42 is started to be executed under a management by the engine integrated-control computer program $39_0$, by a application-execution start process which includes a process of issuing an application execution start command by the host section 30, having the identifier of the engine application $39_j$ as the adjunct data. The execution start process of the engine application $39_j$ is performed when the state of the engine section 40 is the application-loaded state S3, and when the execution of the engine application $39_j$ is started, the state of the engine section 40 undergoes a transition from the application-loaded state S3 to the application operating state S4. Moreover, when the execution start process of the engine application $39_j$ is performed in the application temporarily-stopped state S5, the state of the engine section 40 undergoes a transition from the application temporarily-stopped state S5 to the application operating state S4. On the other hand, when the execution start process of the engine application $39_j$ is performed in the application operating state S4 in which other application is already being executed in the engine section 40, the engine section 40 has already assumed the application operating state 4. Therefore, even when the execution of the engine application $39_j$ is started, the engine section 40 does not undergo a transition of state.

Note that in the application operating state S4, in the engine section 40, the signal level of the engine-output control signal ECT is let to be the significant level. As a result of this, in the application operating state S4, the mode assumed is not the host mode in which the host section 30 controls the liquid crystal display device section 25ML and the speaker 26M, as in the state S1 to state S3 as described above, but is an engine mode in which the engine section 40 controls the liquid crystal display device section 25ML and the speaker 26M.

The engine application $39_j$ which is being executed is stopped by an application stop process which includes a process of issuing an application stop command by the host section 30, having the identifier of the engine application $39_j$ as the adjunct data. By this stop process, there is not left an application which is being executed in the engine section 40, and when there does not exist an application which is stopped temporarily, the state of the engine section 40 undergoes a transition from the application operating state S4 to the application-loaded state S3. As a result of this, the mode is changed from the engine mode to the host mode. Moreover, although the engine section 40 is in the application operating state S4, when the other application is temporarily stopped, as a result of performing the stop process of the engine application $39_j$, when there does not exist an application which is being executed in the engine section 40, the state of the engine section 40 undergoes a transition from the application operating state S4 to the application temporarily-stopped state S5. On the other hand, even when the execution of the engine application $39_j$ is stopped, when other application is being executed in the engine section 40, the engine section 40 does not undergo a transition of state, even when the execution of the engine application $39_j$ is stopped.

Moreover, the temporarily stopped engine application $39_j$ is also stopped by the application stop process which includes a process of issuing an application stop command by the host section 30, having the identifier of the engine application $39_j$ as the adjunct data. This application stop process is performed in the application temporarily-stopped state S5, and when there does not exist an application which is temporarily stopped, the state of the engine section 40 undergoes a transition from the application temporarily-stopped state S5 to the application-loaded state S3. On the other hand, even when the engine application $39_j$ is stopped by the stop process of the temporarily stopped engine application $39_j$ in the application temporarily-stopped state S5, when there exists other application which is temporarily stopped, the engine section 40 does not undergo a transition of state.

The application $39_j$ which is being executed is stopped temporarily by an application temporarily stop process which includes a process of issuing an application temporarily stop command by the host section 30, having the identifier of the engine application $39_j$ as the adjunct data. By this temporarily stop process, as the execution of the engine application $39_j$ is stopped temporarily, and there does not exist an application which is being operated, the state of the engine section 40 undergoes a transition from the application operating state S4 to the application temporarily-stopped step S5. On the other hand, even after the execution of the engine application $39_j$ is stopped temporarily by the temporarily stop process of the engine application $39_j$, when there exists an application in operation, the state of the engine section 40 is not changed.

Note that in the application temporarily-stopped state S5, in the engine section 40, the signal level of the engine-output control signal ECT is let to be the insignificant level. As a result of this, in the application temporarily-stopped state S5, the host mode is assumed similarly as in the state S1 to the state S3 described above.

The temporarily stopped engine application $39_j$ is restarted by an application restart process which includes a process of issuing an application restart command by the host section 30, having the identifier of the engine application $39_j$ as the adjunct data. When this application restart process is performed in the application temporarily-stopped state S5, the state of the engine section 40 undergoes a transition from the application temporarily-stopped state S5 to the application operating state S4. As a result of this, the mode is changed from the host mode to the engine mode. On the other hand, when the execution of the engine application $39_j$ is restarted by the restart process of the engine application $39_j$ in the application operating state S4, the state of the engine section 40 does not change.

Thus, the host section 30 and the engine section 40 operate in coordination while managing the operation of the engine section 40 by the host section 30. Further, in the engine section 40, the engine application is executed appropriately under the control of the engine integrated-control computer program $39_0$.

Next, an operation control process of a host connecting device according to a request from an engine application which is being executed in the engine section 40 will be described while referring mainly to FIG. 7 and FIG. 8. Note that in this embodiment, in the engine application which is being executed in the engine section 40, it is assumed that there arises a necessity of using a no-response device which after receiving an operation command from the host processor 31 does not send back a result of the operation such as a success or a failure of the operation, and data acquired by the operation, as a response to the host processor 31. Devices such as the LED 27 which exerts a visual effect or the back light of the display section 25M or the vibrator 24 which exerts a tactual effect, are appropriate as such no-response device.

Figure 7:
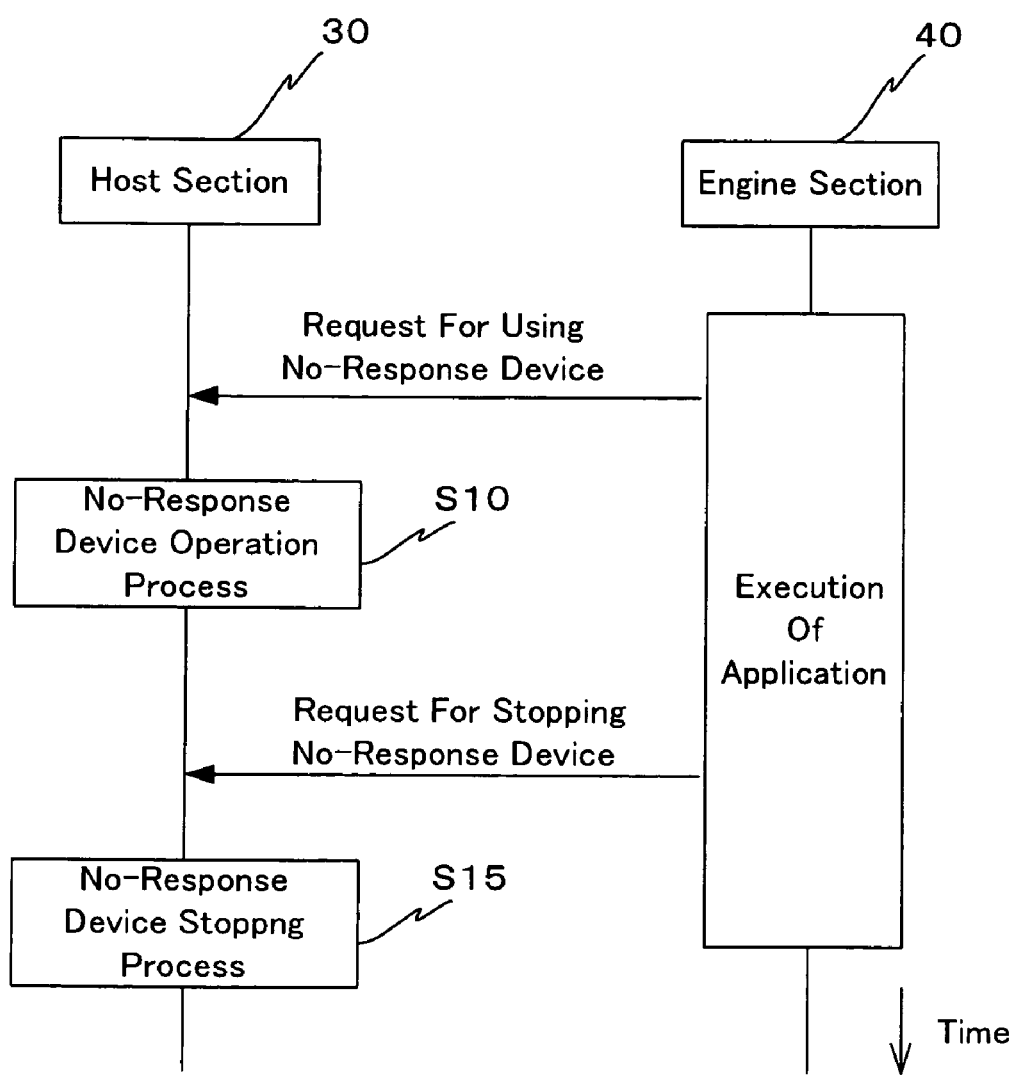
FIG. 7 is a sequence diagram for describing an operation control process of a host connecting device according to a request from an engine application.
Figure 8:
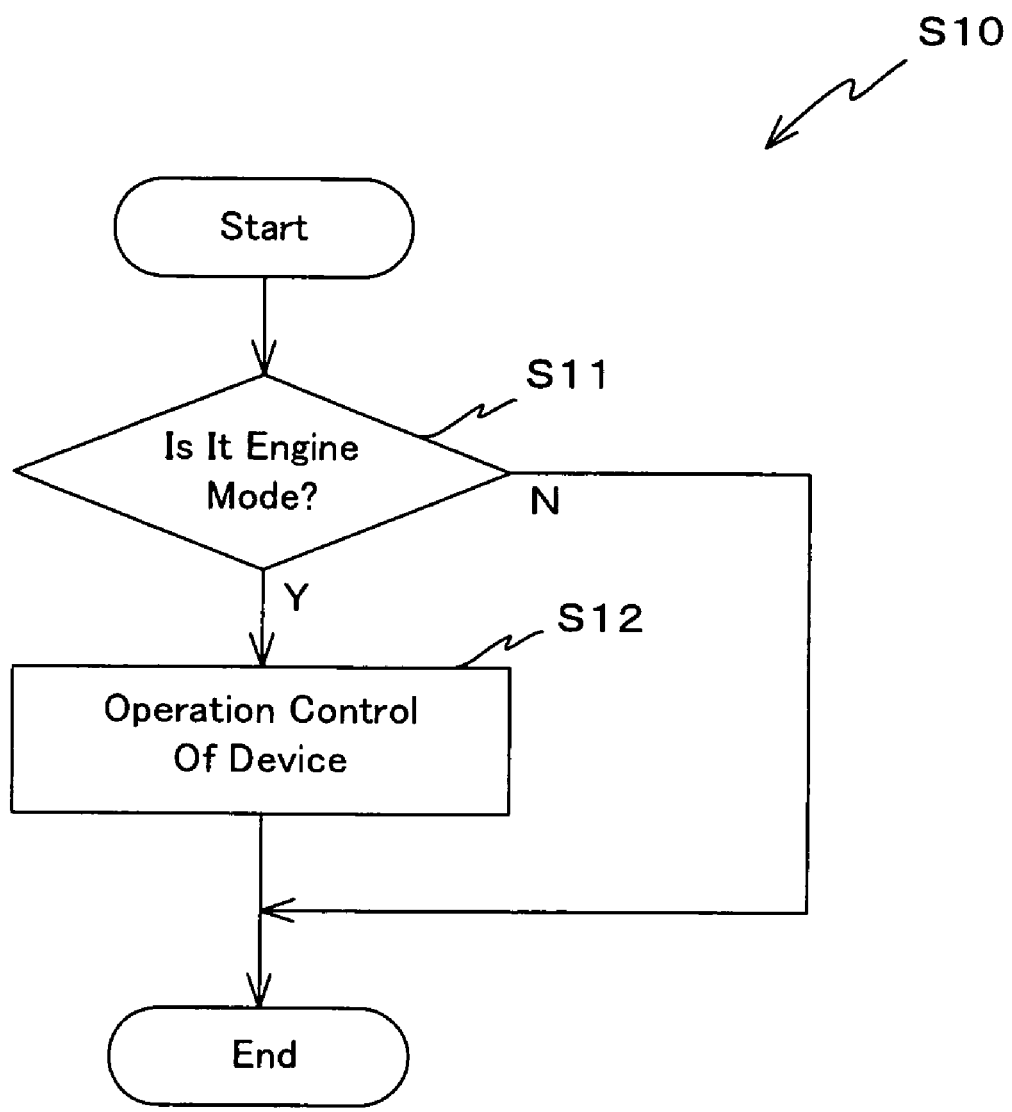
FIG. 8 is a flowchart for describing a no-response device operation control process in FIG. 7.

As the necessity of using the no-response device arises during the execution of the engine application in the engine processor 41, as shown in FIG. 7, first of all, a request for using the no-response device having a type of device and an operation mode as parameters is made from the engine section 40 to the host section 30. In this case, when the no-response device is the LED 27 or the back light 25MB, in the operation mode parameter, the light-emission intensity is specified. Moreover, when the no-response device is the vibrator 24, operation mode parameter such as vibration intensity, is specified.

For making the request for using the no-response device, the engine application, via the engine integrated-control computer program $39_0$, causes the request for using the no-response device having the type of device and the operation mode as parameters to be reflected in the internal data signal DT as transmission data, then issues an internal write signal in the internal control signal ICT and writes in the two-port RAM of the host interface section 52. As data associated with the request for using the no-response device is written in the two-port RAM, the host interface section 52 notifies to the host section 30 that there is data to be notified from the engine section 40, by an interface interrupt signal in the interface control signal ICT.

The host section 30 which has received the notification, first of all, reads out a header portion in data from the engine section 40, in the two-port RAM of the host interface section 52, upon issuing the interface read out signal in the interface control signal CNT. Next, the host section 30 analyzes a content of the head portion which is read out, and identifies the content of the header portion to be the request for using the no-response device. Further, the host section 30 reads out a parameter portion of the request for using the no-response device from the two-port RAM of the host interface section 52 upon issuing the interface read out signal in the interface control signal CNT.

Thus, the host section 30 which has read out information associated with the request for using the no-response device, at step 10, performs a no-response device operation control process. In this no-response device operation control process, as shown in FIG. 8, first of all, at step S11, the host 30 makes a judgment of whether or not the engine section 40 is in the application operating state S4, in other words, in the engine mode, and no attempt is made to stop or stop temporarily the execution of the application of the engine section 40, when there has arisen a need for performing a process associated with an occurrence of an event having a priority over the process of executing the engine application, such as receiving a call. When a result of the judgment is negative, the host section 30 terminates the no-response device operation control process immediately.

On the other hand, when the judgment result at step S11 is affirmative, the process is advanced to step S12. At step S12, the host section 30 controls and operates the no-response device specified by the engine section 40. Further, as an operation of the operation mode specified by the engine section 40 is terminated, the operation control process of the no-response device in the host section 30 according to the request from the engine section 40 is terminated.

Coming back to FIG. 7, after starting the operation of the desired no-response device, when the no-response device is to be stopped due to the visual effect and the tactual effect in the execution of the engine application, and for the reason that the use of the no-response device is not necessary any more, a request for stopping the no-response device having the type of the device as a parameter is made by the engine section 40 to the host section 30. This request for stopping the no-response device, similar to the request for using the no-response device, is written in the two-port RAM of the host interface section 52. Further, the host interface section 52 notifies to the host 30 that there is data to be notified from the engine section 40, by the interface interrupt signal in the interface control signal ICT.

The host section 30 which has received the notification, similarly as for the request for using the no-response device described above, analyzes upon reading out the header portion in the data from the engine section 40 in the two-port RAM of the host interface section 52. As a result of this analysis, the host section 30 which has identified that the content of the header portion is the request for stopping the no-response device, reads out a parameter portion of the request for stopping the no-response device from the two-port RAM of the host interface section 52. Thus, the host section 30 which has read out information associated with the request for stopping the no-response device, at step S15, stops the operation of the no-response device which is specified.

As it has been mentioned above, by performing the operation control process of the no-response device by the coordination of the host section 30 and the engine section 40, a secondary visual effect and tactual effect for increasing a presence of the user is generated at the time of execution of the engine application in the engine section 40.

When there has arisen a necessity to perform a process associated with a generation of an event having a priority over the execution process of the application, such as receiving a call, the host section 30 terminates the operation control immediately controlling the management no response device responding to the request from the engine section 40 at the step 12. Further, the host section 30 concentrates on a process of the higher priority. In this case, although the request for stopping the no-response device is received from the engine section 40, an operation of the no-response device according to the request from the engine section 40 is already stopped. Therefore, a process according to the request for stopping the no-response device is not performed.

As it has been described above, in this embodiment, when the host section 30 receives the request for using the host connecting device from the engine section 40, the host section 30 makes a judgment of whether or not the current state of the engine processor 41 of the engine section 40 is the engine-mode state of controlling actively the operation of the engine connecting device which is connected to the engine processor 41 of the engine section 40, and the engine-mode state is estimated to be continued. Further, when a result of the judgment is affirmative, the host section 30 operates the host connecting device which is specified, in an operation mode specified by the operation mode parameters. As a result of this, in a mode in which the request is made by the engine application which is executed by the engine processor 41, a specific host connecting device which the application has desired to use is operated.

Therefore, it is possible to let the engine application being executed in the engine processor to be able to use the desired host connecting device in a rationalistic range, without installing a redundant device in devices which are connected to the host processor 31 and the engine processor 41 respectively. Consequently, it is possible to structure compactly the cellular phone 10 having a structure including the host section 30 which includes the host processor 31, and performs processing associated with a communication with an outside, and the engine section 40 which includes the engine processor 41, and executes a predetermined function under a management of the host section 30.

Note that in the embodiment, the operation of the host connecting device is let to start according to the request for using from the engine section 40, and then the operation of the host connecting device is let to stop according to the request for stopping from the engine section 40. However, when the request for using from the engine section 40 is for a regular use of the no-response device for a fixed time, in the operation mode parameters of the request for using the no-response device, an operation time and an operation pattern can be let to be specified, and the request for stopping from the engine section 40 can be let not to be made.

Figure 9:
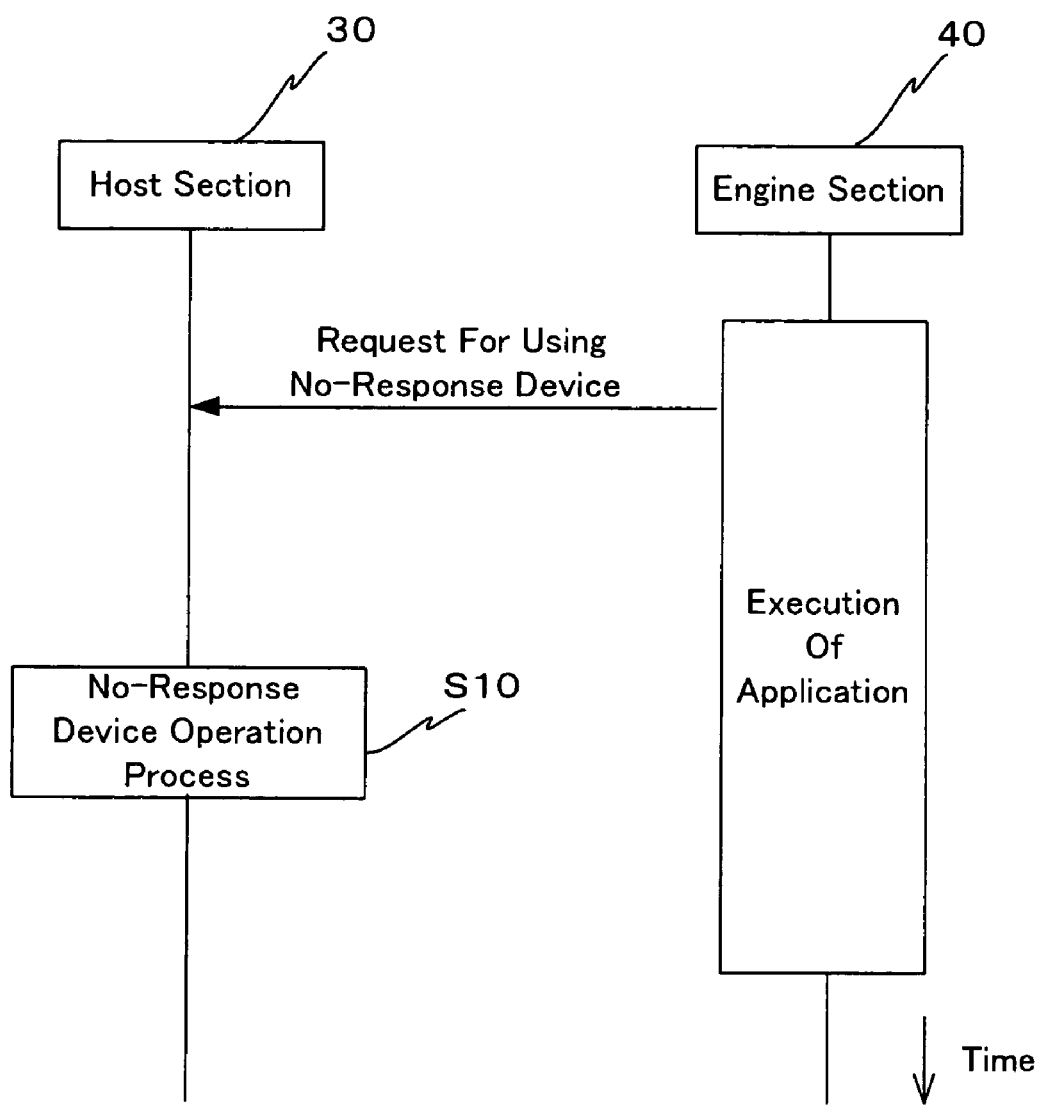
FIG. 9 is a sequence diagram for describing a first modified embodiment of the operation control process of the host connecting device according to the request from the engine application.

An operation control process of the host connecting device in this case, is performed according to a sequence shown in FIG. 9. Note that in operation mode parameters in the request for using the no-response device, when the no-response device is the LED 27 or the back light 25MB, a light-emission cycle, a light-emission time in one cycle of light emission, a frequency of repetition of light-emission cycle, and a light-emission intensity are specified. Moreover, when the no-response device is the vibrator 24, a length of a vibration cycle which is formed by a vibration period and non-vibration period, a length of the vibration period, a frequency of repetition of an operation of the vibration cycle, and vibration intensity are specified.

Even in this case, similarly as in the case in the embodiment, as shown in FIG. 9, first of all, a request for using the no-response device having the type of device and the operation mode as parameters is made by the engine section 40 to the host section 30. The host section 30, which has received the request for using the no-response device, similarly as in the case of the embodiment, at step 10, performs the no-response device operation control process. When the judgment result at step S11 (refer to FIG. 8) is negative, the host section 30 terminates the no-response device operation control process immediately.

On the other hand, when the judgment result at step S11 is affirmative, at step S12 (refer to FIG. 8), the host section 30 operates the no-response device specified by the engine section 40, according to the operation mode specified by the engine section 40, by controlling the no-response device. Further, as the operation according to the operation mode specified by the engine section 40 is terminated, the operation control process of the no-response device in the host section 30 according to the request from the engine section 40 is terminated.

Even in this case, similarly as in the embodiment, when there has arisen a need for performing a process associated with an occurrence of an event having a priority over the execution process of the application, such as receiving a call, during an operation control of the no-response device according to the request from the engine section 40 at step S12, the host 30 terminates the operation control immediately. Further, the host section 30 concentrates on a process of higher priority.

Moreover, in the embodiment, the operation mode parameters are let to be associated with the request for using the no-response device. However, for example, when the no-response device is an LED for which the light-emission intensity cannot be specified, the operation mode parameter can be let not to be associated at the time of making the request for using the no-response device.

Moreover, in the embodiment, the host connecting device for which the engine section 40 makes a request for using is let to be the no-response device. As a matter of course, the host connecting device can be let to be a response device which sends back a response to a control from the host section 30, such as the acceleration and attitude sensor 28. In this case, as shown in FIG. 10 for example, similarly as in the case in FIG. 9, first of all, a request for using the response device having the type of device and the operation mode as parameters is made by the engine section 40 to the host section 30. In the host section 30 which has received the request for using the response device, at step S20, similarly as in the case of step S10 mentioned above, when the engine section 40 is in the application operating state S4, in other words, when the engine section 40 is in the engine mode, and no attempt is made to stop or stop temporarily the execution of the engine application of the engine section 40, when there has arisen a need for performing a process associated with an occurrence of an event having a priority over the execution process of the engine application, such as receiving a call, the host section 30 performs a response device operation control process. Further, when there is a response from the response device, the host section 30 notifies a response result to the engine section 40. The engine integrated-control computer program $39_0$ of the engine section 40 which has received the response result, passes the response result to the engine application in operation for which the request of using the response device is made.

Furthermore, the host section 30 can be let to have a structure including one processor, or let to have a two-processor structure which includes a processor for communication and a processor for application integration, and the control of the engine section 40 in the embodiment can be let to be performed by the processor for application integration.

Moreover, in the embodiment, the display-output selecting section 53 and the audio-output selecting section 54 are let to be built-in in the engine processor 41. However, it is possible to dispose at least one of the display-output selecting section 53 and the audio-output selecting section 54 outside the engine processor 41.

Furthermore, in the embodiment, the host interface section 52 is let to include the two-port RAM. However, the host interface section 52 can be let to have any structure provided that the structure can handle interfacing with the host section 30.

Moreover, in the embodiment, in the application operating state S4, the application loading process and the application unloading process are not let to be performed. However, the application loading process and the application unloading process can be let to be performed in the application operating state S4.

Furthermore, in the embodiment, the application temporarily-stop process is not let to be retried. However, the application temporarily-stop process can also be let to be retried.

In the embodiment, the cellular phone is let to be of a clamshell type. However, the present invention is also applicable to a cellular phone of a straight type, a revolving type, and a sliding type.

Moreover, in the embodiment, the present invention is applied to the cellular phone. However, as a matter of course, the present invention can be applied to other mobile communication terminals.

As it has been mentioned above, a coordination method of the present invention is applicable to a coordination operation between a host section which includes a host processor, and performs processing associated with a communication with an outside, and an engine section which includes an engine processor, and executes a predetermined function under a management of the host section.

Moreover, the present invention is also applicable to a mobile communication terminal which includes the host section which performs a processing associated with the communication with the outside, and the engine section which executes the predetermined function under the management of the host section.

What is claimed is:

1. A coordination method which is a method of operating by coordination between a host section which performs a processing associated with a communication with an outside, and an engine section which executes a predetermined function under a management of the host section, in a mobile communication terminal, comprising steps of:
   making request for using specific host connecting device, at which a request for using a specific host connecting device from among host connecting devices which are connected to a host processor of the host section is sent from the engine section to the host section;
   judging operation mode at which the host section which has received the request for using the specific host connecting device makes a judgment of whether or not an engine processor of the engine section is in an engine-mode state of controlling actively an operation of at least one engine connecting device which is connected to the engine processor of the engine section, and the engine-mode state is estimated to be continued; and
   performing specified operation of engine at which, when a judgment result at the step of judging operation mode is affirmative, the host processor operates the specific host connecting device.

2. The coordination method according to claim 1, wherein when the judgment result at the step of judging operation mode is negative, the host section ignores the request for using the specific host connecting device.

3. The coordination method according to claim 1, wherein the specific host connecting device is a no-response device of a type in which, after an operation command is received from the host processor, a response is not sent back to the host processor.

4. A mobile communication terminal comprising:
   a host section which comprises a host processor, and performs a processing associated with a communication with an outside;
   at least one host connecting device which is connected to the host processor;
   an engine section which comprises an engine processor, and performs a predetermined function operation under a management of the host section; and
   at least one engine connecting device which is connected to the engine processor, wherein
   the host section comprises,
      a host connecting device controlling means which controls an operation of the host connecting device,
      an operation mode judging means which makes a judgment of whether or not the engine processor of the engine section is in an engine-mode state of controlling actively an operation of the engine connecting device, and the engine-mode state is estimated to be continued, and
      a means for giving command for use of specific host device which, when a judgment result by the operation mode judging means is affirmative, when a request for using a specific host connecting device from among the host connecting devices, notified from the engine section is received, gives a command for operating the specific host connecting device, to the host connecting device controlling means, and
   the engine section comprises a means for making request for using device for specific host which sends the request for using the specific host connecting device to the host section.

5. The mobile communication terminal according to claim 4, wherein
   the specific host connecting device is a no-response device of a type in which, after an operation command is received from the host processor, a response is not sent back to the host processor.

6. The mobile communication terminal according to claim 5, wherein
   the specific host connecting device is a device selected from a group including a vibrator, a light emitting diode, and a back light of a liquid crystal display apparatus in a case in which a liquid crystal display device section of the liquid crystal display apparatus is included in the engine connecting device.

7. The mobile communication terminal according to claim 4, wherein
   the host section further comprises a wireless communication section which is connected to the host processor, and performs a wireless communication with a base station of a mobile communication network.

* * * * *